United States Patent
Prairie et al.

(10) Patent No.: US 6,454,019 B1
(45) Date of Patent: Sep. 24, 2002

(54) AGRICULTURAL IMPLEMENT DOWN PRESSURE SYSTEM

(75) Inventors: Douglas S. Prairie, Fargo, ND (US); David J. Keats, Brantford; Einar M. Skolseg, Guelph, both of (CA); William J. Dietrich, Sr., Goodfield, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/605,943

(22) Filed: Jun. 28, 2000

(51) Int. Cl.$^7$ ................................................ A01C 5/06
(52) U.S. Cl. ...................... 172/677; 172/261; 111/163; 111/926
(58) Field of Search ................................ 111/163, 926, 111/149, 200; 172/677, 261

(56) References Cited

U.S. PATENT DOCUMENTS

| | | | |
|---|---|---|---|
| 3,195,485 A | 7/1965 | Reynolds | 111/86 |
| 3,964,639 A | 6/1976 | Norris et al. | 221/278 |
| 4,269,531 A | 5/1981 | Brolin | 403/97 |
| 4,759,301 A | 7/1988 | Thomas | 111/85 |
| 4,899,672 A | 2/1990 | Paul | 111/174 |
| 4,977,841 A | * 12/1990 | Truax | 111/62 |
| 4,991,661 A | 2/1991 | Barenthsen | 172/662 |
| 5,279,236 A | * 1/1994 | Truax | 111/139 |
| 5,392,722 A | 2/1995 | Snipes et al. | 111/174 |
| 5,522,328 A | 6/1996 | Long | 111/176 |
| 5,531,276 A | 7/1996 | Noonan et al. | 172/662 |
| 5,570,746 A | 11/1996 | Jones et al. | 172/22 |
| 5,603,643 A | 2/1997 | Krivec | 439/822 |
| 5,702,132 A | 12/1997 | Friederich et al. | 285/235 |
| 6,082,276 A | * 7/2000 | Klein et al. | 111/164 |

OTHER PUBLICATIONS

Excerpts from Universal Group Catalog, "Rubber Torsion Axles" (3 pages), date unknown.
Excerpts from Lovejoy Catalog, "Lovejoy ROSTA" (5 pages), date unknown.

* cited by examiner

Primary Examiner—Christopher J. Novosad

(57) ABSTRACT

An agricultural implement includes a frame, a grow medium manipulation surface configured to manipulate and move a growing medium and at least one elastomeric torsion element coupled to the surface. The growing medium manipulation surface moves between a first growing medium engagement position in which the surface manipulates and moves the growing medium and a second growing medium non-engagement position. The elastomeric torsion element resiliently biases the surface towards the first growing medium engagement position. In one exemplary embodiment, the growing medium engagement surface comprises the surface of a furrow opening device on an agricultural implement. In one exemplary embodiment, the implement additionally includes an adjustment mechanism coupled to the elastomeric torsion element. The adjustment mechanism moves between a first adjustment position in which the torsion element biases the surface towards the first engagement position with a first force and a second adjustment position in which the element biases the surface towards the first engagement position with a second force. In another exemplary embodiment, the adjustment mechanism also enables the elastomeric torsion element to apply a reverse force biasing the surface away from the first growing medium engagement position.

25 Claims, 6 Drawing Sheets

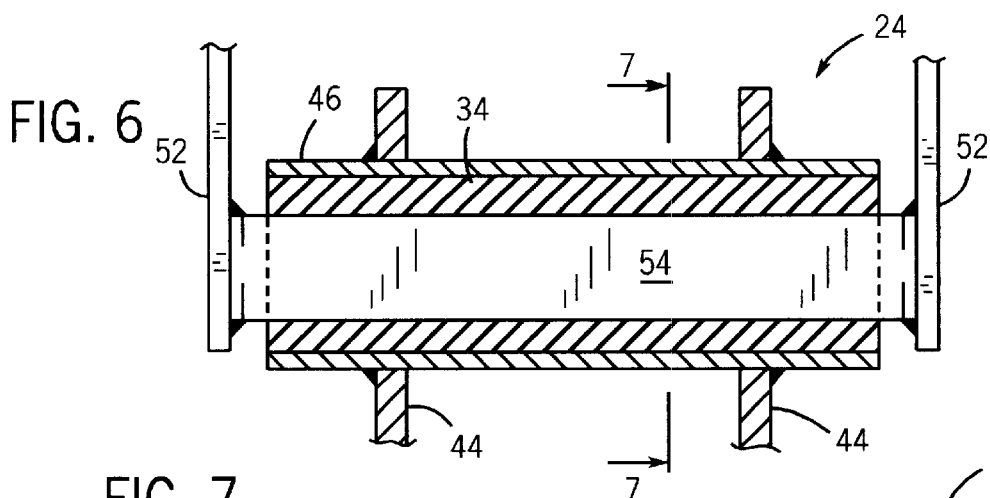
FIG. 6
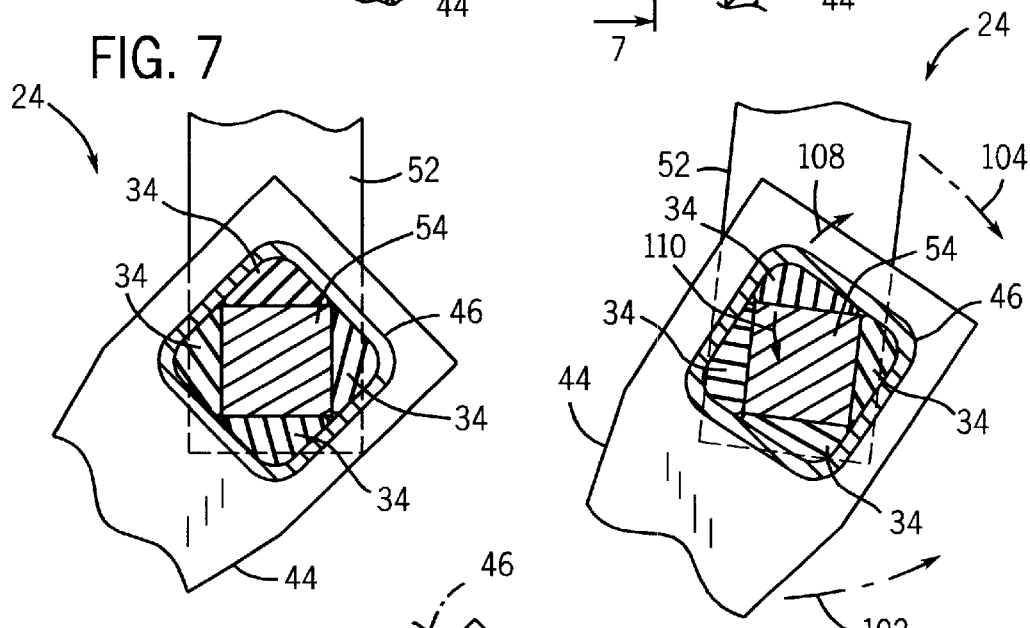
FIG. 7
FIG. 8
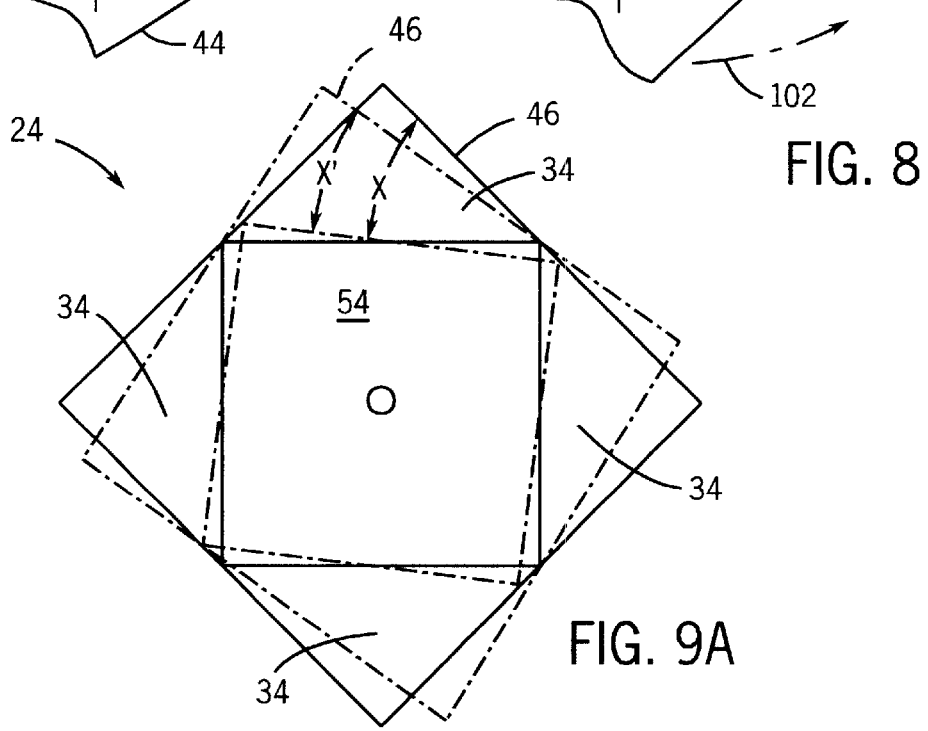
FIG. 9A

AGRICULTURAL IMPLEMENT DOWN PRESSURE SYSTEM

FIELD OF THE INVENTION

The present invention relates to agricultural implements used to engage and manipulate a growing medium to enable seed, fertilizer, insecticide or herbicide to be deposited into the growing medium. In particular, the present invention relates to a mechanism which forces a growing medium manipulation surface, such as a surface of a furrow opening device, towards and into the growing medium or soil.

BACKGROUND OF THE INVENTION

Many different types of agricultural implements are known for engaging and manipulating a growing medium or soil to enable seed, fertilizer, insecticide or herbicide to be deposited onto or into the soil or to prepare the soil beforehand. Examples of such implements include planters, drills, disks, plows, cultivators and the like. Each such implement includes surfaces which engage and manipulate the soil. For example, planters typically include a pair of spaced disks which are forced into the soil and which sever and separate the soil to create a furrow into which seed is deposited. In such devices, large metal springs are usually employed to apply a downward force to the furrow opening disks or to whatever soil manipulation surface or edge is used. The spring is usually held in place by a bracket which provides discrete spring positions intended for the application of down pressure.

In the case of planters, the amount of downward force applied to the furrow opening disk is critical in that it establishes the depth of the furrow and the depth at which seed is planted. Accurate seed depth placement plays a critical role in crop yields. Unfortunately, adjusting the amount of downward force applied by the springs to the furrow opening disks in conventional planters is tedious and time consuming. In many situations, the metal springs and the brackets retaining such springs rust and become jammed with debris, making such adjustment physically challenging. Adjustment of the springs to alternatively create an upward force, such as when planting in lighter soils, generally requires that the entire spring assembly be reassembled. Moreover, such planters provide only a few discrete positions and only a few discrete force levels. Moreover, such planter spring assemblies include multiple parts which increase the complexity, manufacturing cost and assembly time of the planter.

Thus, there is a continuing need for a force applying system for planters and other soil engaging agricultural implements: (1) which is easy to adjust, (2) which provides an infinite range of force adjustment between both upper and lower down pressure or force boundaries, (3) which is adjustable between upward force and downward force states seamlessly, without disassembly and (4) which is simple and has relatively few parts, reducing manufacturing and assembly time and cost.

SUMMARY OF THE INVENTION

The present invention provides an agricultural implement which includes a frame, a furrow opening device having at least one surface and at least elastomeric torsion element coupled to the at least one surface. The surface moves between a first cutting position in which the surface is configured to cut into the soil to create a furrow in a second non-cutting position. The at least one torsion element resiliently biases the surface towards the first cutting position.

The present also provides an agricultural implement which includes a frame, a growing medium manipulation surface configured to manipulate and move a growing medium and at least one elastomeric torsion element coupled to the surface. The surface moves between a first growing medium engagement position in which the surface manipulates and moves the growing medium and a second growing medium non-engagement position. The at least one torsion element resiliently biases the surface towards the first growing medium engagement position.

The present invention also provides an agricultural implement which includes a frame, a row unit support, a furrow opening device coupled to the support, a furrow closing device coupled to the support and a force applying system coupled between the frame and the support to force the support and the furrow opening device into the soil. The force applying system includes a four bar linkage having a first end pivotably coupled to the frame and a second end pivotably coupled to the support and further having a first and second parallel upper links and first and second parallel lower links. The force applying system further includes a first torsion arm pivotably coupled to the lower links, a bracket pivotably coupled between the upper links, a second torsion arm, a screw rotatably coupled to the bracket and movably supporting the second torsion arm, a tube fixedly coupled to one of the first and second torsion arms, a shaft coupled to the other of the first and second torsion arms and extending through the tube and an elastomeric torsion element disposed in the tube between the tube and the shaft. The elastomeric torsion element is resiliently deformed such that the element applies a torque to the first and second arms in attempting to resiliently return to its original shape. As a result, the four bar linkage applies a force to the support.

The present invention also provides an agricultural implement including a frame, a row unit support, a furrow opening device coupled to the support, a furrow closing device coupled to the support, and a force applying system coupled between the frame and the support to force the support and the furrow opening device into soil. The force applying system includes a four bar linkage having a first end pivotably coupled to the frame and a second end pivotably coupled to the support. The four bar linkage includes first and second parallel upper links and first and second parallel lower links. This system further includes a first torsion arm coupled to the frame, a second torsion arm pivotably coupled to the first torsion arm, a tube fixedly coupled to the second torsion arm, a shaft fixedly coupled to at least one of the first and second parallel upper links or the first and second parallel lower links and an elastomeric torsion element. The shaft extends through the tube. The elastomeric torsion element is disposed in the tube between the tube and the shaft. The elastomeric torsion element is resiliently deformed such that the element applies a torque to at least one of the first and second upper links and the first and second lower links in attempting to resiliently return to its original shape. As a result, the four bar linkage applies a force to the support.

BRIEF DESCRIPTION OF THE DRAWINGS

FIG. 6 is a fragmentary sectional view of the implement of FIG. 3 taken along lines 6—6.

FIG. 7 is a fragmentary sectional view of the implement of FIG. 6 taken along lines 7—7.

FIG. 8 is a fragmentary sectional view of the implement of FIG. 6 taken along lines 7—7 depicting force applying system in the compressed state shown in FIG. 5.

FIG. 9A is a schematic illustration depicting the force applying system in an uncompressed state in solid lines and depicting the force applying system in a compressed state in broken lines to illustrate the change in the force applying system when adjusted from the state shown in FIG. 7 to the state shown in FIG. 8.

DETAILED DESCRIPTION OF THE PREFERRED EMBODIMENTS

Figure 1:
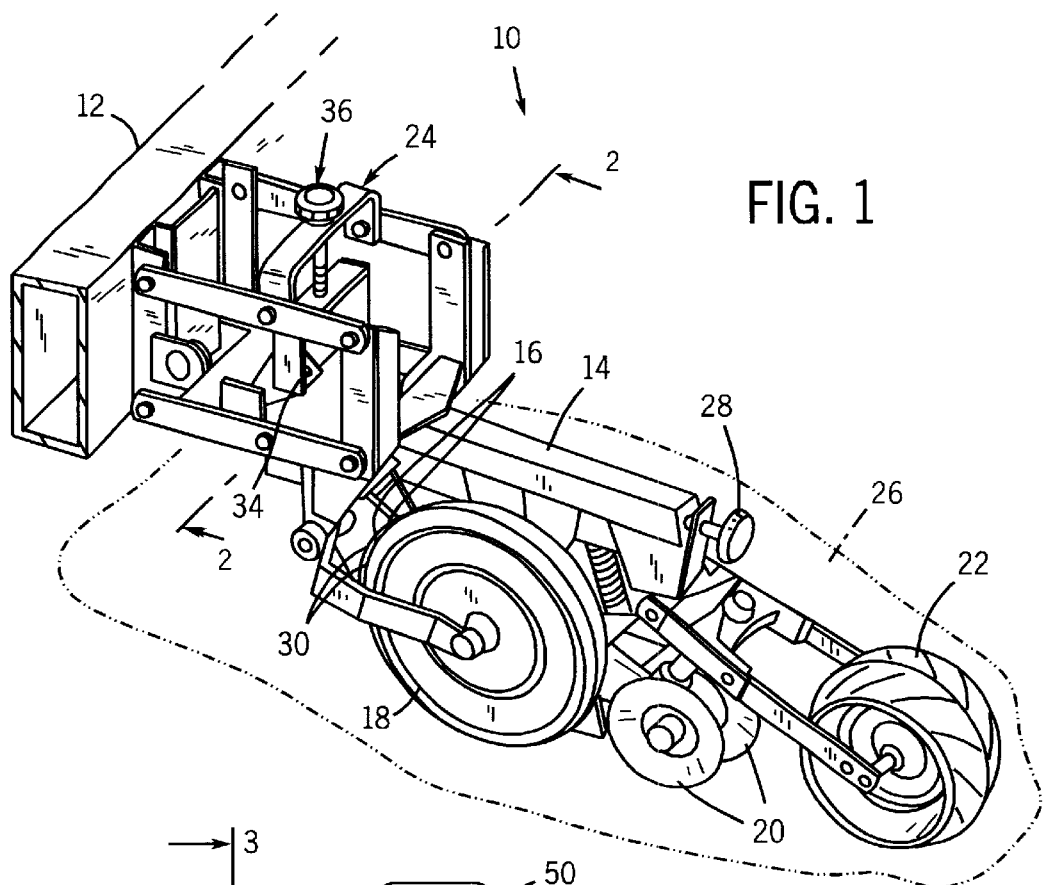
FIG. 1 is a perspective view of an agricultural implement including a force applying system of the present invention.

FIG. 1 is a perspective view of an agricultural implement 10, preferably a planter. Implement 10 generally includes tool bar or frame 12, row unit support 14, furrow opening disks 16, depth gauge wheel 18, furrow closing disks 20, compaction wheel 22, and down pressure system 24. Frame 12 is conventionally known and is configured to support a plurality of such row units along its length. Frame 12 is part of a much larger structure which is movably supported above the ground or soil 26 and is configured for being pulled by a tractor or other work vehicle. As will be appreciated, the exact configuration of frame 12 will vary depending upon the particular agricultural implement.

Row unit support 14, furrow opening disks 16, depth gauge wheel 18, furrow closing disk 20 and compression wheel 22 are conventionally known components. Support 14 comprises a subframe assembly coupled to down pressure system 24 and configured to carry each of furrow opening disks 16, depth gauge wheel 18, furrow closing disks 20 and furrow compression wheel 22. As shown by FIG. 1, support 14 includes an adjustment knob 28 connected to a conventionally known adjustment mechanism (not shown), whereupon rotation of knob 28, the height of support 14 relative to wheel 18, which rides upon the top of soil 26, is varied to adjust the depth at which disks 16, disks 20 and wheel 22 project into the soil.

Disks 16 consist of a pair of rotatable disks which are rotatably supported by support 14. Disks 16 include circumferential edges or surfaces 30 which are angled with respect to one another so as to sever and separate soil 26 to create a furrow into which seed is deposited. Although not shown in FIG. 1, implement 10 additionally includes a seed delivery system which delivers seed from a storage tank through a placement tube and into the furrow created by disks 16. Depending upon the particular application, implement 10 may alternatively include delivery systems for delivering other types of liquid or particulate material including herbicide, insecticide or herbicide.

Furrow closing disks 20 are rotated supported by support 14 behind disks 16 and behind the delivery tube of the material delivery system (not shown). Furrow closing disks 20 manipulate and move the soil over the deposited seed to close the furrow. Compression wheel 22 is supported by frame 12 behind furrow closing disks 20 and further compresses the soil over the deposited seed.

Down pressure system 24 is coupled between frame 12 and support 14. Down pressure system 24 applies a downward pressure or force to support 14 to force surfaces 30 of disks 16 against and into soil 26. To do so, system 24 includes an elastomeric torsion element 34 which is twisted or deformed such that element 34 applies a torque to support 14 in attempting to resiliently return to its original shape. This torque constitutes a downward force or pressure which forces surfaces 30 downward into soil 26.

Down pressure system 24 additionally includes an adjustment mechanism 36 which adjusts the degree at which element 34 is twisted or compressed and also the direction of the twist or compression applied to element 34. By adjusting the degree of twist applied to element 34, mechanism 36 enables the user to vary the amount of downward force applied to support 14 and to surfaces 30 of disks 16. By adjusting the direction of twist applied to element 34, mechanism 36 enables the user to modify element 34 such that element 34 applies an upward force to support 14 and to surfaces 30 of disks 16. Such an upward force may be necessary when planting in or working with lighter soils.

Figure 2:
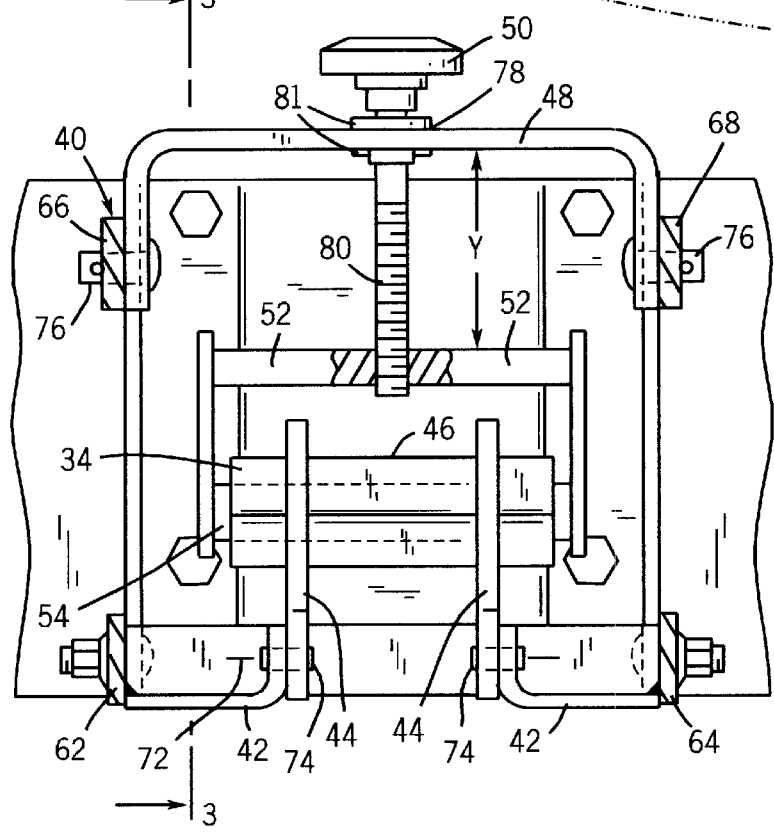
FIG. 2 is a fragmentary sectional view of the implement of FIG. 1 taken along lines 2—2.
Figure 3:
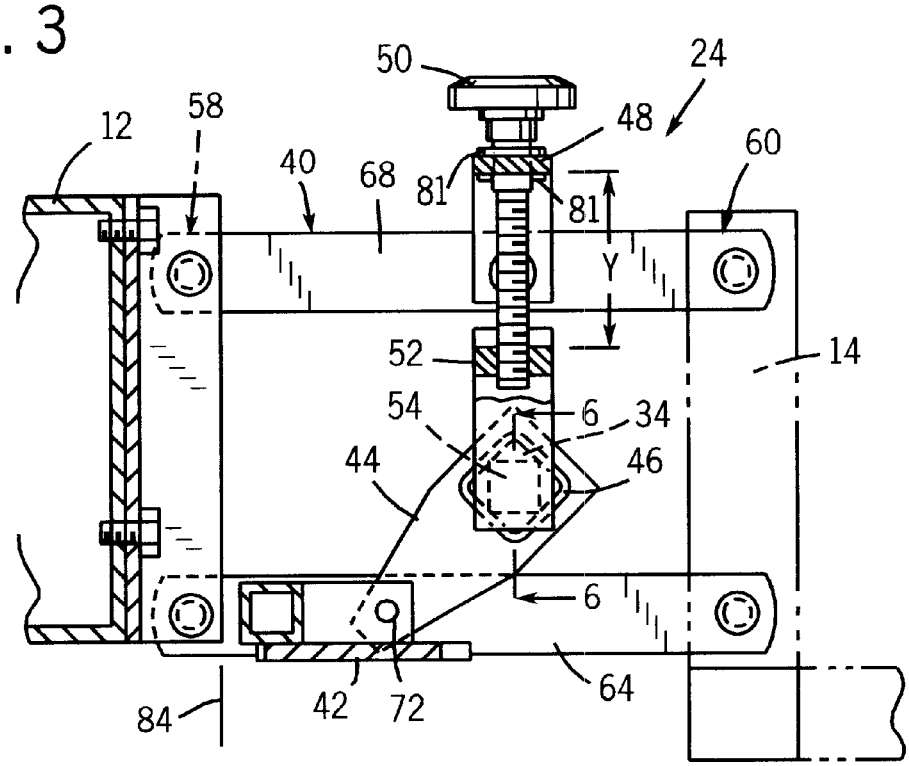
FIG. 3 is a fragmentary sectional view of the implement of FIG. 2 taken along lines 3—13.

FIGS. 2 and 3 illustrate down pressure system 24 in greater detail. As shown by FIGS. 2 and 3, system 24 generally includes four bar linkage 40, lower extensions 42, lower torsion arms 44, tube 46, upper pivot bracket 48, lead screw 50, upper torsion arms 52, shaft 54 and elastomeric torsion element 34. Four bar linkage 40 extends between frame 12 and support 14 and includes a first end 58 pivotably coupled to frame 12 and a second end 60 pivotably coupled to support 14. Four bar linkage 40 includes parallel lower links 62, 64 and parallel upper links 66, 68. Each link is relatively rigid and has opposite ends pivotably coupled to frame 12 and support 14.

Lower extensions 42 extend from lower links 62 and 64 and are generally stationary relative to links 62 and 64. Extensions 42 pivotably support lower torsion arms 44 for pivotable movement about axis 72.

Lower torsion arms 44 are pivotably pinned to extensions 42 by pins 74 and are fixedly coupled to tube 46 which extends between arms 44. Arms 44 pivotably support tube 46 relative to shaft 54.

Tube 46 comprises an elongate hollow tube configured to receive shaft 54 and to also receive elastomeric torsion element 34.

Pivot bracket 48 comprises an elongate rigid member extending between upper links 66 and 68 and pivotably coupled to each of upper links 66 and 68. Bracket 48 is preferably pivotably pinned to upper links 66 and 68 by pins 76. Pivot bracket 48 carries lead screw 50.

Lead screw 50 comprises an elongate threaded screw having an upper portion 78 rotatably supported by and axially retained relative to pivot bracket 48 and a threaded portion 80 threadably engaging upper torsion arms 52. In the exemplary embodiment, upper portion 78 of lead screw 50 is axially retained relative to pivot bracket 48 by bushings 81 or other similar retention mechanisms. Rotation of lead screw 50 causes upper torsion arms 52 to axially move along threaded portion 80.

Upper torsion arms 52 extend from lead screw 50 to shaft 54 for supporting shaft 54. Shaft 54 extends through tube 46 between arms 52. Shaft 54 is fixedly secured to arms 52 and is preferably configured such that shaft 54 cannot be rotated relative to tube 46 without compression or twisting of elastomeric torsion element 34.

Elastomeric torsion element 34 comprises a resilient elastomeric material, such as rubber, disposed between tube 46 and shaft 54. Torsion element 34 compresses or twists upon relative rotation of shaft 54 and tube 46 and applies a torque to both shaft 54 and tube 46 in attempting to resiliently return to its original position or shape. As discussed in brief with respect to FIG. 1, this torque is ultimately transmitted to support 14 and surfaces 30 of furrow opening disks 16.

Figure 4:
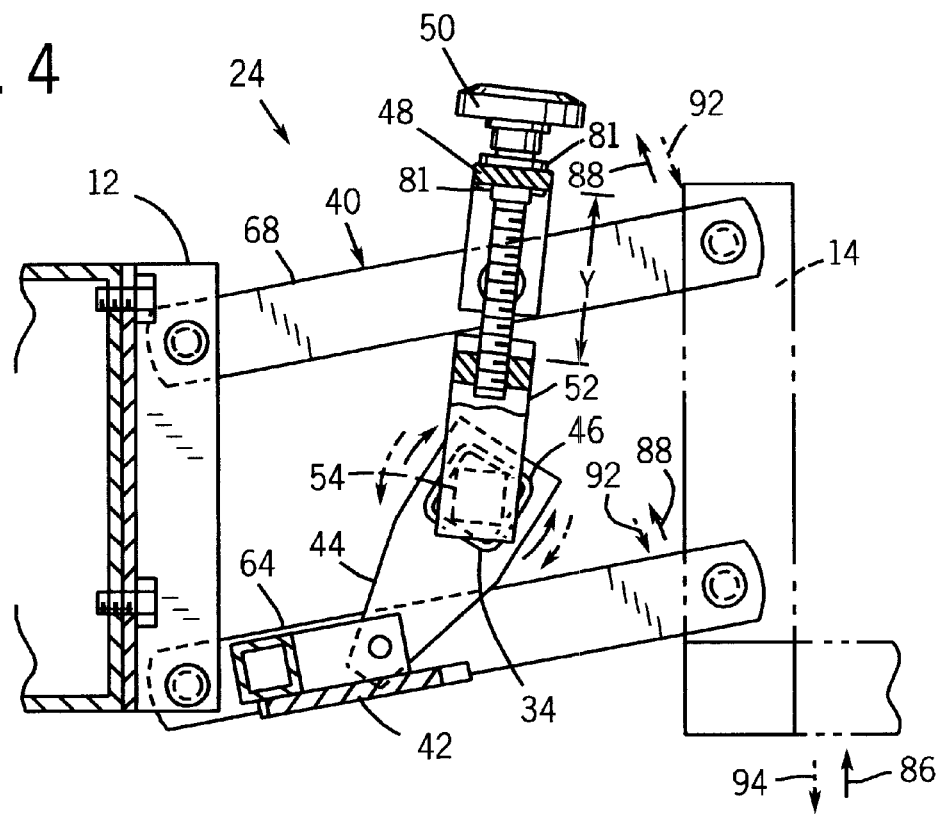
FIG. 4 is a fragmentary sectional view of the implement of FIG. 2 taken along lines 3—3 and depicting an external upward force applied to the implement.

FIGS. 3 and 4 best illustrate the functioning of down pressure system 24 in an intermediate or neutral state. As shown in FIG. 3, when system 24 is in such a neutral state, lead screw 50 is rotated to a point such that pivot bracket 48 is spaced from pivot arms 52 by distance Y. As a result, elastomeric torsion element 34 resiliently biases tube 46 and shaft 54 to the relative position shown in FIG. 3 such that four bar linkage 40 extends outward from frame 12 perpendicular to plane 84. As a result, links 62, 64, 66 and 68 of four bar linkage 40 perpendicularly extend from plane 84. In this neutral state, support 14 and furrow opening disks 16 carried by support 14 are pressed towards soil 26 with a force substantially equal to the weight of implement 10 less those forces distributed to and among the wheels (not shown) supporting implement 10 above soil 26 and those components of implement 10 in engagement with the underlying soil 26.

FIG. 4 illustrates system 24 reacting to upward force from support 14 in the direction indicated by arrow 86. This upward force causes four bar linkage 40 to pivot in a counterclockwise direction as indicated by arrow 88 in FIG. 4. As a result, tube 46 and shaft 54 rotate relative to one another to compress elastomeric torsion element 34 as shown in FIG. 4. Elastomeric torsion element 34 attempts return to its initial shape shown in FIG. 3 and to return four bar linkage 40 to the original configuration shown in FIG. 3. In doing this, torsion element 34 applies torque to four bar linkage in the clockwise direction indicated by arrows 92. This torque results in a force applied to support 14 in the generally downward direction indicated by arrow 94.

Figures 5, 9B:
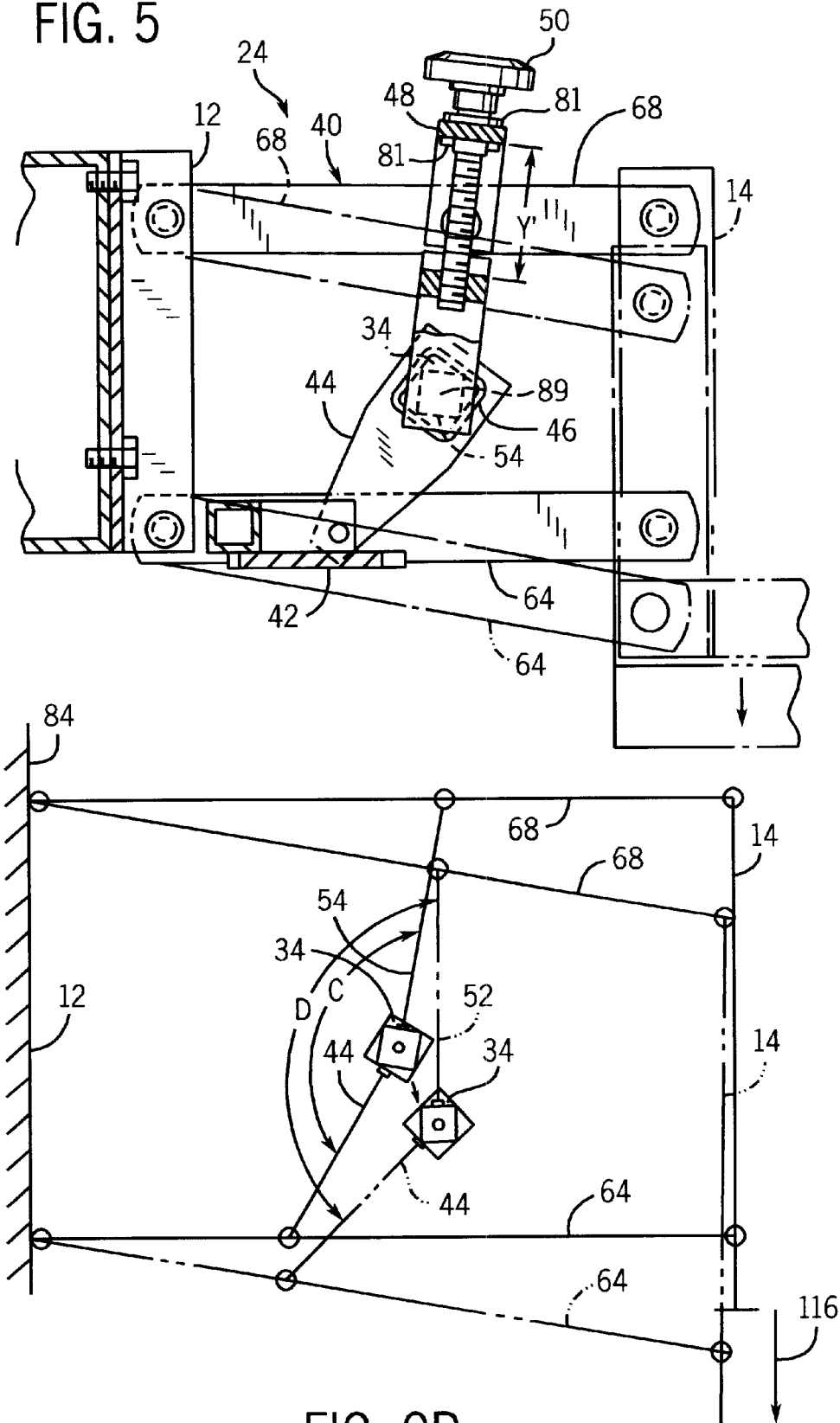
FIG. 5 is a fragmentary sectional view of the implement of FIG. 2 taken along lines 3—3 and depicting adjustment of the force applying system such that the system applies a downward force.
FIG. 9B is a schematic illustration depicting the force applying system in a compressed force applying state shown in solid lines and in an uncompressed state shown in broken lines.

FIGS. 5–9B illustrate system 24 adjusted to apply a greater downward force to support 14 and to surfaces 30 of furrow opening disk 16 (shown in FIG. 1). As shown by FIG. 5, lead screw 50 has been rotated to move upper torsion arm 52 along threaded portion 80 to shorten the distance separating pivot bracket 48 and torsion arm 52 to the distance Y'. As a result, pivot bracket 48 and upper torsion arm 52 pivot in a clockwise direction as seen in FIG. 5 about axis 89 and lower torsion arms 44 pivot in a counterclockwise direction as seen in FIG. 5 about axis 89. In turn, tube 46 and shaft 54 rotate relative to one another in the directions indicated by arrows 102 and 104, respectively, from the positions shown in FIGS. 6 and 7 where element 34 is an uncompressed, untwisted state to a compressed and twisted state shown in FIG. 8. As shown by FIG. 9A, tube 46 and shaft 54 are rotated relative to one another such that angle X is reduced to angle X', compressing elastomeric torsion element 34.

Because element 34 is elastomeric and resilient, elastomeric torsion element 34 applies a force to both tube 46 and shaft 54 in the directions indicated by arrows 108 and 110, respectively, as element 34 attempts to resiliently return to the uncompressed state shown in FIGS. 6 and 7.

The end result of this compression of element 34 is schematically shown in FIG. 9B. To return to an uncompressed state, element 34 applies force to tube 46 and shaft 54 to attempt to pivot lower torsion arms 44 and upper torsion arms 52 from angle C to angle D in which element 34 is no longer compressed. In other words, element 34 continues to apply a force to arms 44 and 52 until four bar linkage attains the position shown in broken lines in which four bar linkage 40 obliquely extends from plane 84. Since surfaces 30 of furrow opening disks 16 are in engagement with soil 26 and prevent four bar linkage from pivoting to the position shown in broken lines, elastomeric torsion element 34 continues to apply a downward force to support 14 and to furrow opening disks 16 in the direction indicated by arrow 116.

Figure 10:
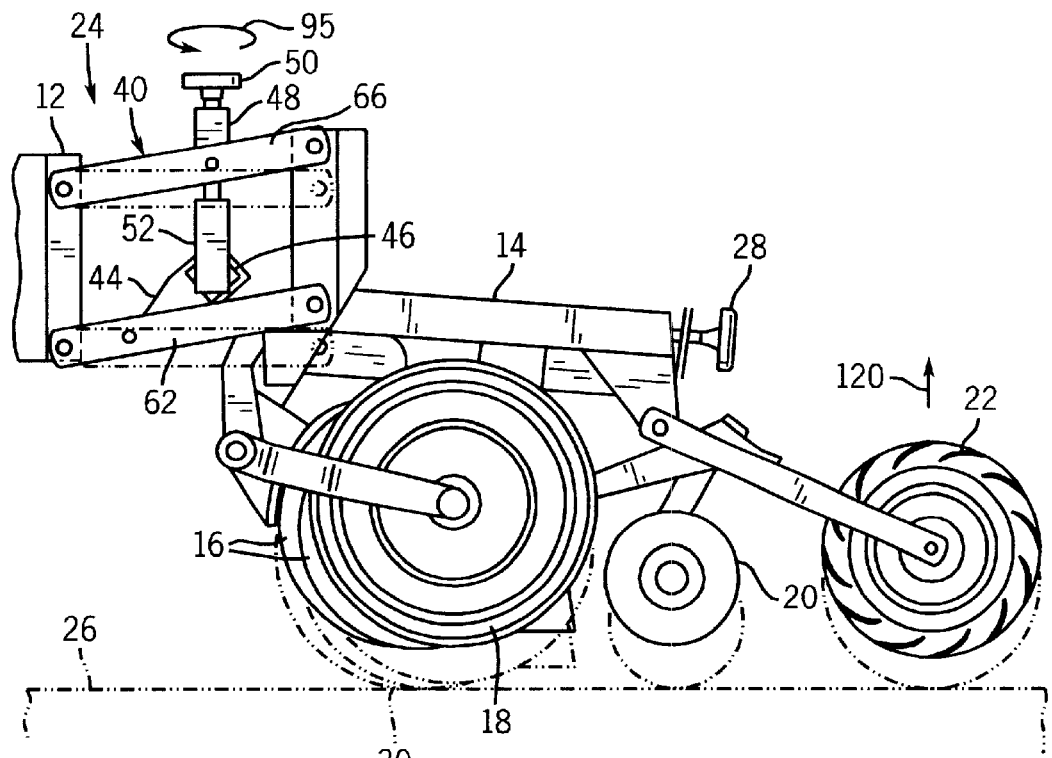
FIG. 10 is a side elevational view of the implement of FIG. 1 illustrating the force applying system applying an upward force.
Figure 11:
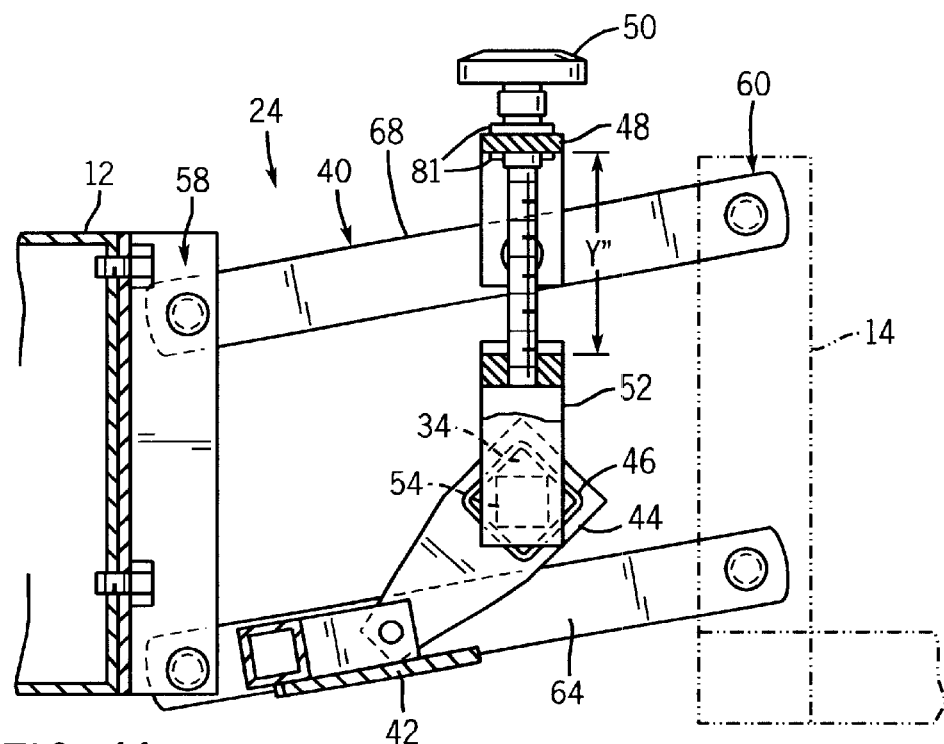
FIG. 11 is a fragmentary sectional view of the implement of FIG. 2 taken along lines 3—3 with the force applying system in a state shown in FIG. 10.

FIGS. 10 and 11 illustrate lead screw 50 rotated in an opposite direction as indicated by arrow 95 to move upper torsion arm 52 along threaded portion 80 so as to increase the distance between pivot bracket 48 and arms 52 to the distance Y". Distance Y" is greater than distance Y. As a result, elastomeric torsion element 34 is compressed and twisted in an opposite direction such that element 34 applies forces to tube 46 and shaft 54 in generally opposite directions to those shown in FIG. 8. The force applied by element 34 to support 14 and to disks 16 is in an upward direction as indicated by arrow 120 in FIG. 10. Although the upward force applied by element 34 to support 14 and the components carried by 14 is insufficient to lift support 14 and to carry components above the ground or soil 26, this force does reduce the overall force pressing support 14 towards the ground due to the weight of support 14 and the components it carries.

Figure 12:
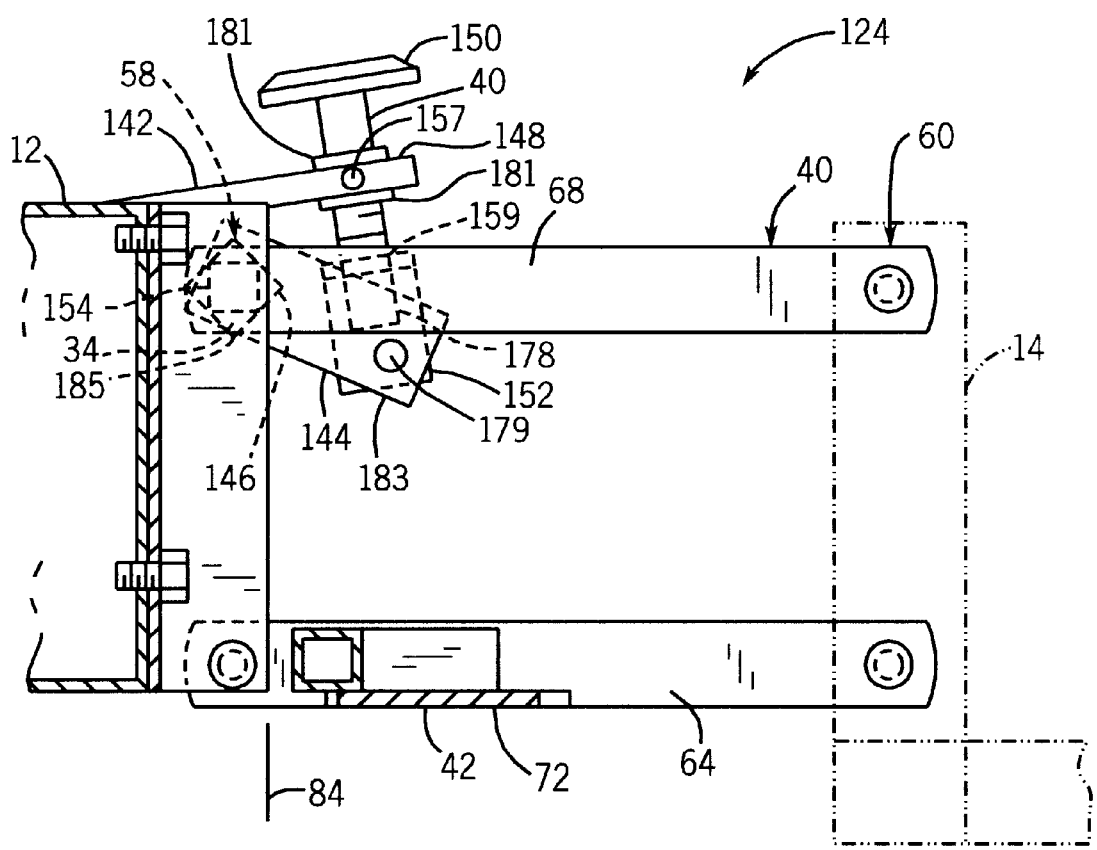
FIG. 12 is a fragmentary sectional view of an alternative embodiment of the implement of FIG. 2 taken along lines 3—3.

FIG. 12 is a side elevational view of down pressure system 124, an alternative embodiment of down pressure system 24 shown in FIG. 3. Down pressure system 124 is similar to down pressure system 24 except that down pressure system 124 includes extensions 142, torsion arms 144, tube 146, pivot bracket 148, lead screw 150, torsion arm 152 and shaft 154 in lieu of lower extensions 42, lower torsion arms 44, tube 46, upper pivot bracket 48, lead screw 50, upper torsion arm 52, and shaft 54, respectively. In addition to elastomeric torsion element 34, those remaining elements of down pressure system 124 which correspond to like elements of down pressure system 24 are numbered similarly. Extensions 142 generally comprise a pair of rigid bars or other structures stationarily affixed to and extending rearwardly from frame 12 on opposite sides of pivot bracket 148. Extensions 142 pivotally support pivot bracket 148 to permit bracket 148 to pivot about axis 157.

Pivot bracket 148 comprises a rigid bar or other structural member extending between extensions 142 and pivotally coupled to extensions 142. In the exemplary embodiment, pivot bracket 148 includes a pair of opposing bores which receive a corresponding pair of inwardly extending bosses projecting from extensions 142 to permit bracket 148 to pivot about axis 157. As will be appreciated, bracket 48 may be pivotally coupled to and between extensions 142 by various other pivotal support arrangements.

Lead screw 150 comprises an elongate threaded screw having a lower portion 178 coupled to torsion arm 152 and an upper portion 180 rotatably journaled and axially fixed to pivot bracket 148. In the exemplary embodiment, upper portion 180 is rotatably journaled and axially fixed to pivot bracket 48 by means of a pair of bushings 181 that allow rotation but axially secure lead screw 50 to bracket 148. As noted above, rotation of lead screw 150 causes torsion arm 152 to axially move along lower portion 178 of lead screw 150.

Torsion arm 152 comprises an elongate U-shaped member extending between torsion arms 44 and coupled to lower portion 178 of lead screw 150 intermediate torsion arms 144. Torsion arm 148 includes an internally threaded bore 1 59 which threadably engages external threads of lead screw 150 to retain torsion arm 152 in any one of a plurality of positions along the axial length of the externally threaded portion of lead screw 50. Torsion arm 152 is pivotally coupled to torsion arms 144. In the exemplary embodiment, torsion member 152 includes a pair of bosses or pins 179, wherein ends of the pins are rotatably journaled within a corresponding bore in each of torsion arms 144. The pins 179 may either be non-rotatably affixed to torsion arm 152 or may be rotatably positioned within a bore extending through ends of torsion arm 152.

Torsion arms 144 comprise a pair of spaced arms extending on opposite sides of lead screw 150. Each arm 144 has a first end 183 pivotally coupled to torsion arm 152 and a second end 185 fixedly coupled to tube 146 such as by welding. As will be appreciated, torsion arms 144 may alternatively comprise various other structures for coupling tube 146 to torsion arm 152.

Tube 146 comprises an elongate hollow tube fixedly secured between torsion arms 144 and configured to receive shaft 154 and to also receive elastomeric torsion element 34.

Shaft 154 comprises an elongate shaft extending through tube 46 between links 66 (shown in FIG. 2), 68, wherein the axial ends of shaft 154 are non-rotatably coupled to links 66, 68. Shaft 154 is preferably configured such that shaft 154 cannot be rotated relative to tube 146 without compression or twisting of elastomeric torsion element 34.

Elastomeric torsion element 34 comprises a resilient elastomeric material, such as rubber, disposed between tube 146 and shaft 154. Torsion element 34 compresses or twists upon relative rotation of shaft 154 and tube 146 and applies a torque to both shaft 154 and tube 146 in attempting to resiliently return to its original position or shape. This torque is ultimately transmitted to support 14 and surfaces 30 of furrow opening disks 16 (shown in FIG. 1).

In operation, down pressure system 124 functions similarly to down pressure system 24. In particular, FIG. 12 illustrates down pressure system 124 in an intermediate or neutral state where lead screw 150 is rotated to a point such that elastomeric torsion element 34 resiliently biases tube 154 and interconnected to links 66, 68 to the relative position shown in FIG. 12 such that four bar linkage 40 extends outward from frame 12 perpendicular to plane 84. In this neutral state, support 14 and furrow opening disk 16 carried by support 14 are pressed towards soil 26 with a force substantially equal to the weight of the implement 10 less those forces distributed to and among the wheels (not shown) supporting implement 10 above soil 26 and those components of implement 10 in engagement with the underlying soil 26. In response to an upward force from support 14, shaft 154 rotates relative to tube 146 in a counter-clockwise direction to twist and compress elastomeric torsion element 34. As a result, elastomeric torsion element 34 attempts to return to its initial shape by applying torque to shaft 154 and four bar linkage 40 in a clockwise direction.

As with down pressure system 24, the down pressure applied by system 124 may be adjusted by rotation of lead screw 150. In addition, rotation of lead screw 150 may also result in elastomeric torsion element 34 applying an upward force to four bar linkage 40 to reduce the overall force pressing support 14 towards the ground due to the weight of support 14 and the components it carries.

Overall, down pressure systems 24 and 124 enable the force at which surfaces 30 of disks 16 are pressed against soil 26 to be quickly and easily adjusted by simple rotation of lead screw 50. Because systems 24 and 124 utilize an elastomeric torsion element 34 instead of a coil compression spring, systems 24 and 124 are less susceptible to corrosion and rust and are less susceptible to becoming jammed with debris. As a result, systems 24 and 124 are more easily adjusted. Because systems 24 and 124 provide an infinite range of force adjustments between force boundaries, systems 24 and 124 enable more precise control of the amount of down pressure applied to furrow opening disks 16. Because systems 24 and 124 utilize torsion element 34, systems 24 and 124 may be adjusted between upward force and downward force states seamlessly, without disassembly. Moreover, because systems 24 and 124 are simple and include relatively few parts, systems 24 and 124 are more easily manufactured with lower costs and a shorter assembly time.

FIGS. 1–12 depict but two exemplary contemplated embodiments. Various other embodiments, although not specifically shown, are also contemplated within the present disclosure. For example, in lieu of being employed on a planter, systems 24 and 124 may alternatively be employed on other agricultural implements in which a ground-engaging and cutting tool or surface must be forced downward into the soil to manipulate the soil. In lieu of utilizing a pair of upper links and a pair of lower links, systems 24 and 124 may alternatively utilize a single upper link and a single lower link. In lieu of tube 46, 146 and shaft 54, 154 being rectangular, tube 46, 146 and shaft 54, 154 may alternatively have various other noncircular shapes. Moreover, tube 46, 146 and shaft 54, 154 may have various circular and noncircular shapes so long as both tube 46, 146 and shaft 54, 154 do not rotate relative to one another without compressing or uncompressing elastomeric torsion element 34. For example, elastomeric torsion element 34 may alternatively be keyed, bonded, co-molded or otherwise fixedly coupled to a generally round tube 46, 146 or a generally round shaft 54, 154 wherein the other of tube 46, 146 and shaft 54, 154 cannot be moved relative to torsion elements 34 without compressing or uncompressing torsion element 34. In lieu of tube 46 and shaft 54 being supported by arms 44 and arms 52, respectively, tube 46 and shaft 54 may alternatively be carried by arms 52 and arms 44, respectively. In lieu of pivot bracket 48, lead screw 50 and arms 52 being coupled to upper links 66, 68 and arms 44 being coupled to lower links 62, 64, pivot bracket 48, lead screw 50 and arms 52 may alternatively be coupled to lower links 62, 64 and arms 44 may alternatively be coupled to upper links 66, 68. In lieu of utilizing a lead screw 50 to serve both functions of removably supporting arms 52 in a linear fashion between lower links 62, 64 and upper links 66, 68 and selectively retaining arms 52 in any one of the plurality of positions between lower links 62, 64 and upper links 66, 68 to provide different force levels, system 24 may include separate distinct components for providing the same functions. For example, arms 52 may alternatively be slidably movable along a shaft of a structure relative to pivot bracket 48 to any one of a plurality of preset positions, wherein one of arms 52 and the bracket are provided with a detent such as a depression or hole and the other of arms 52 and the bracket 48 are provided with a detent-engaging member such as a protuberance or pin, enabling arms 52 to be selectively retained in one of the plurality of positions. As evident from the relatively cursory list of alternatives above, the present disclosure contemplates a multitude of different variations.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. An agricultural implement comprising:
    a frame;
    a furrow opening device having at least one surface, wherein the surface moves between a first cutting position in which the surface is configured to cut into soil to create a furrow and a second non-cutting position;
    at least one elastomeric torsion element coupled to the at least one surface, wherein the at least one torsion element resiliently biases the surface towards the first cutting position;
    a support coupled to the furrow opening device;
    a four bar linkage having a first end pivotably coupled to the frame and a second end pivotably coupled to the support, the four bar linkage including first and second parallel upper links and first and second parallel lower links;
    a first torsion arm pivotably coupled between one of the upper links and the lower links;
    a second torsion arm coupled to the other of the upper links and the lower links;
    a tube fixedly coupled to one of the first torsion arm and the second torsion arm; and
    a shaft coupled to the other of the first torsion arm and the second torsion arm, the shaft extending through the tube, wherein the elastomeric torsion element is disposed in the tube between the tube and the shaft and wherein the elastomeric element is resiliently deformed such that the element applies a torque to the first and second torsion arms in attempting to resiliently return to its original shape.

2. The implement of claim 1 including an adjustment mechanism coupled to the at least one elastomeric torsion element, wherein the adjustment mechanism moves between a first position in which the torsion element biases the surface towards the first cutting position with a first force and a second position in which the element biases the surface towards the first cutting position with a second force.

3. The implement of claim 1, wherein the first torsion arm is lineally movable between a plurality of positions relative to the upper links and the lower links and wherein the implement further includes a retaining mechanism configured to selectively retain the first torsion arm in each of the plurality of positions.

4. The implement of claim 3, wherein the retaining mechanism includes a screw rotatably coupled to the first torsion arm and one of the upper links and the lower links, wherein the screw threadably engages either the first torsion arm or said one of the upper links and the lower links to movably support the first torsion arm between the plurality of positions and to selectively retain the first torsion arm in each of the plurality of positions.

5. The implement of claim 4, wherein the screw is rotatably coupled to the upper link.

6. The implement of claim 5, wherein the screw threadably engages the first torsion arm to movably support the upper arm between the plurality of positions.

7. The implement of claim 3, wherein the first torsion arm is pivotably coupled between the upper links, wherein the first torsion arm is linearly movable between a plurality of positions and wherein the retaining mechanism selectively retains the first torsion arm in each of the plurality of positions.

8. The implement of claim 1, wherein the first torsion arm is pivotably coupled between the lower links, wherein the tube is fixedly coupled to the first torsion arm and wherein the shaft is coupled to the second torsion arm.

9. The implement of claim 1, wherein the furrow opening device comprises at least one furrow opening disk.

10. The implement of claim 1 including a furrow closing device supported by the frame behind the furrow opening device.

11. An agricultural implement comprising:
    a frame;
    a growing medium manipulation surface configured to manipulate and move a growing medium, wherein the surface moves between a first growing medium engagement position in which the surface manipulates and moves the growing medium and a second growing medium non-engagement position;
    at least one elastomeric torsion element coupled to the surface, wherein the at least one torsion element resiliently biases the surface towards the first growing medium engagement position;
    a support coupled to the manipulation surface;
    a first member having a first end pivotably coupled to the frame and a second end pivotably coupled to the support;
    a second member having a first end pivotably coupled to the frame and a second end pivotably coupled to the support;
    a first torsion arm pivotably coupled to one of the first member and the second member;
    a second torsion arm coupled to the other of the first member and the second member;
    a tube fixedly coupled to one of the first arm and the second arm; and
    a shaft coupled to the other of the first arm and the second arm and extending through the tube, wherein the at least one elastomeric torsion element is disposed in the tube between the tube and the shaft and wherein the at least one elastomeric element is resiliently deformed such that the element applies a torque to the first member and the second member in attempting to resiliently return to its original shape.

12. The implement of claim 11, including an adjustment mechanism coupled to the at least one elastomeric torsion element, wherein the mechanism moves between the first position in which the torsion element biases the surface towards the first growing medium engagement position with a first force and a second position in which the element biases the surface towards the growing medium engagement position with a second force.

13. The implement of claim 11, wherein the first arm is linearly movable between a plurality of positions relative to the first member and the second member and wherein the implement further includes a retaining mechanism configured to selectively retain the first arm in each of the plurality of positions.

14. The implement of claim 13, wherein the retaining mechanism includes a screw rotatably coupled to the first arm and one of the first member and the second member, wherein the screw threadably engages either the first arm or said one of the first and second members to movably support the first arm between the plurality of positions and to selectively retain the first arm in each of the plurality of positions.

15. The implement of claim 11, wherein the growing medium manipulation surface comprises a surface of a furrow opening device.

16. An agricultural implement comprising:
a frame;
a row unit support;
a furrow opening device coupled to the support;
a furrow closing device coupled to the support; and
a force applying system coupled between the frame and the support to force the support and the furrow opening device into soil, the system including:
a four bar linkage having a first end pivotably coupled to the frame and a second end pivotably coupled to the support, the four bar linkage including first and second parallel upper links and first and second parallel lower links;
a first torsion arm pivotably coupled to the lower links;
a bracket pivotably coupled between the upper links;
a second torsion arm;
a screw rotatably coupled to the bracket and movably supporting the second torsion arm;
a tube fixedly coupled to one of the first and second torsion arms;
a shaft coupled to the other of the first and second torsion arms and extending through the tube; and
an elastomeric torsion element disposed in the tube between the tube and the shaft, wherein the elastomeric torsion element is resiliently deformed such that the element applies a torque to the first and second arms in attempting to resiliently return to its original shape, whereby the four bar linkage applies a force to the support.

17. An agricultural implement comprising:
a frame;
a row unit support;
a furrow opening device coupled to the support;
a furrow closing device coupled to the support; and
a force applying system coupled between the frame and the support to force the support and the furrow opening device into soil, the system including:
a four bar linkage having a first end pivotally coupled to the frame and a second end pivotally coupled to the support, the four bar linkage including first and second parallel upper links and first and second parallel lower links;
a first torsion arm coupled to the frame;
a second torsion arm pivotally coupled to the first torsion arm;
a tube fixedly coupled to the second torsion arm;
a shaft fixedly coupled to at least one of the first and second parallel upper links or the first and second parallel lower links, the shaft extending through the tube; and
an elastomeric torsion element disposed in the tube between the tube and the shaft, wherein the elastomeric torsion element is resiliently deformed such that the element applies a torque to said at least one of the first and second upper links and first and second lower links in attempting to resiliently return to its original shape, whereby the four bar linkage applies a force to the support.

18. An agricultural implement comprising:
a frame;
a furrow opening device having at least one surface, wherein the surface moves between a first cutting position in which the surface is configured to cut into soil to create a furrow and a second non-cutting position;
at least one elastomeric torsion element coupled to the at least one surface, wherein the at least one torsion element resiliently biases the surface towards the first cutting position;
a support coupled to the furrow opening device;
a four bar linkage having a first end pivotally coupled to the frame and a second end pivotally coupled to the support, the four bar linkage including first and second parallel upper links and first and second parallel lower links;
a first torsion arm coupled to the frame;
a second torsion arm pivotally coupled to the first torsion arm;
a tube fixedly coupled to the second torsion arm; and
a shaft fixedly coupled to at least one of the first and second parallel upper links or the first and second parallel lower links, the shaft extending through the tube, wherein the elastomeric torsion element is disposed in the tube between the tube and the shaft and wherein the elastomeric element is resiliently deformed such that the element applies a torque to said at least one of the first and second parallel upper links or the first and second parallel lower links in attempting to resiliently return to its original shape.

19. The implement of claim 18, wherein the first torsion arm is linearly movable between a plurality of positions relative to the upper links and the lower links and wherein the implement further includes a retaining mechanism configured to selectively retain the first torsion arm in each of the plurality of positions.

20. The implement of claim 19, including at least one extension extending from the frame and a pivot member pivotally coupled to said at least one extension, wherein the retaining mechanism includes a screw pivotally coupled to the first torsion arm, wherein the screw threadably engages the pivot member to movably support the first torsion arm between the plurality of positions and to selectively retain the first torsion arm in each of the plurality of positions.

21. An agricultural implement comprising:
a frame;
a growing medium manipulation surface configured to manipulate and move a growing medium, wherein the surface moves between a first growing medium engagement position in which the surface manipulates and moves the growing medium and a second growing medium non-engagement position;

at least one elastomeric torsion element coupled to the surface, wherein the at least one torsion element resiliently biases the surface towards the first growing medium engagement position;

a support coupled to the furrow opening device;

a four bar linkage having a first end pivotally coupled to the frame and a second end pivotally coupled to the support, the four bar linkage including first and second parallel upper links and first and second parallel lower links;

a first torsion arm coupled to the frame;

a second torsion arm pivotally coupled to the first torsion arm;

a tube fixedly coupled to the second torsion arm; and a shaft fixedly coupled to at least one of the first and second parallel upper links or the first and second parallel lower links, the shaft extending through the tube, wherein the elastomeric torsion element is disposed in the tube between the tube and the shaft and wherein the elastomeric element is resiliently deformed such that the element applies a torque to said at least one of the first and second parallel upper links or the first and second parallel lower links in attempting to resiliently return to its original shape.

22. The implement of claim 21, wherein the first torsion arm is linearly movable between a plurality of positions relative to the upper links and the lower links and wherein the implement further includes a retaining mechanism configured to selectively retain the first torsion arm in each of the plurality of positions.

23. The implement of claim 22, including at least one extension extending from the frame and a pivot member pivotally coupled to said at least one extension, wherein the retaining mechanism includes a screw pivotally coupled to the first torsion arm, wherein the screw threadably engages the pivot member to movably support the first torsion arm between the plurality of positions and to selectively retain the first torsion arm in each of the plurality of positions.

24. A agricultural implement comprising:
  a frame adapted to be pulled across a field of soil by a work vehicle;
    a row unit support having a forward end toward said frame and an opposing rear end;
    a furrow-opening device coupled to said support;
    a furrow closing device coupled to said support rearwardly of said furrow opening device; and
    a force applying system coupled between said frame and said support to apply force to said support and furrow opening device toward the soil, the system including:
  a four-bar linkage having a first end pivotally coupled to said frame and a second end pivotally coupled to said support, said four-bar linkage including first and second parallel upper links and first and second parallel lower links;

a first torsion arm coupled to said lower links;

a bracket pivotably coupled between said upper links;

a second torsion arm;

a screw rotatably coupled to said bracket and movably supporting the second torsion arm;

a tube fixedly coupled to one of said first and second torsion arms;

a shaft coupled to the other of said first and second torsion arms and extending through said tube; and an elastomeric torsion element disposed in said tube between said tube and said shaft, wherein said elastomeric torsion element is resiliently deformed such that said element applies a torque to said first and second arms in attempting to resiliently return to its original shape, whereby said four-bar linkage applies a force to said support.

25. An agricultural implement comprising:
  a frame adapted to be pulled across a field, of soil by a work vehicle;
    a row unit support having a forward end toward said frame and an opposing rear end;
    a furrow-opening device coupled to said support;
    a furrow closing device coupled to said support rearwardly of said furrow opening device; and
    a force applying system coupled between said frame and said support to apply force to said support and furrow opening device toward the soil, the system including:
  a four-bar linkage having a first end pivotally coupled to said frame and a second end pivotally coupled to said support, said four-bar linkage including first and second parallel upper links and first and second parallel lower links;

a first torsion arm pivotably coupled to said frame;

a second torsion arm pivotally coupled to the first torsion arm;

a tube fixedly coupled to said second torsion arm;

a shaft fixedly coupled to at least one of said first and second parallel upper links or said first and second parallel lower links, said shaft extending through said tube; and an elastomeric torsion element disposed in said tube between said tube and said shaft, wherein said elastomeric torsion element is resiliently deformed such that said element applies a torque to said at least one of said first and second upper links and said first and second lower links in attempting to resiliently return to its original shape, whereby the four-bar linkage applies a force to said support.

* * * * *